Dec. 11, 1951     E. P. HURD     2,578,477
FISHING REEL
Filed June 8, 1946     2 SHEETS—SHEET 1
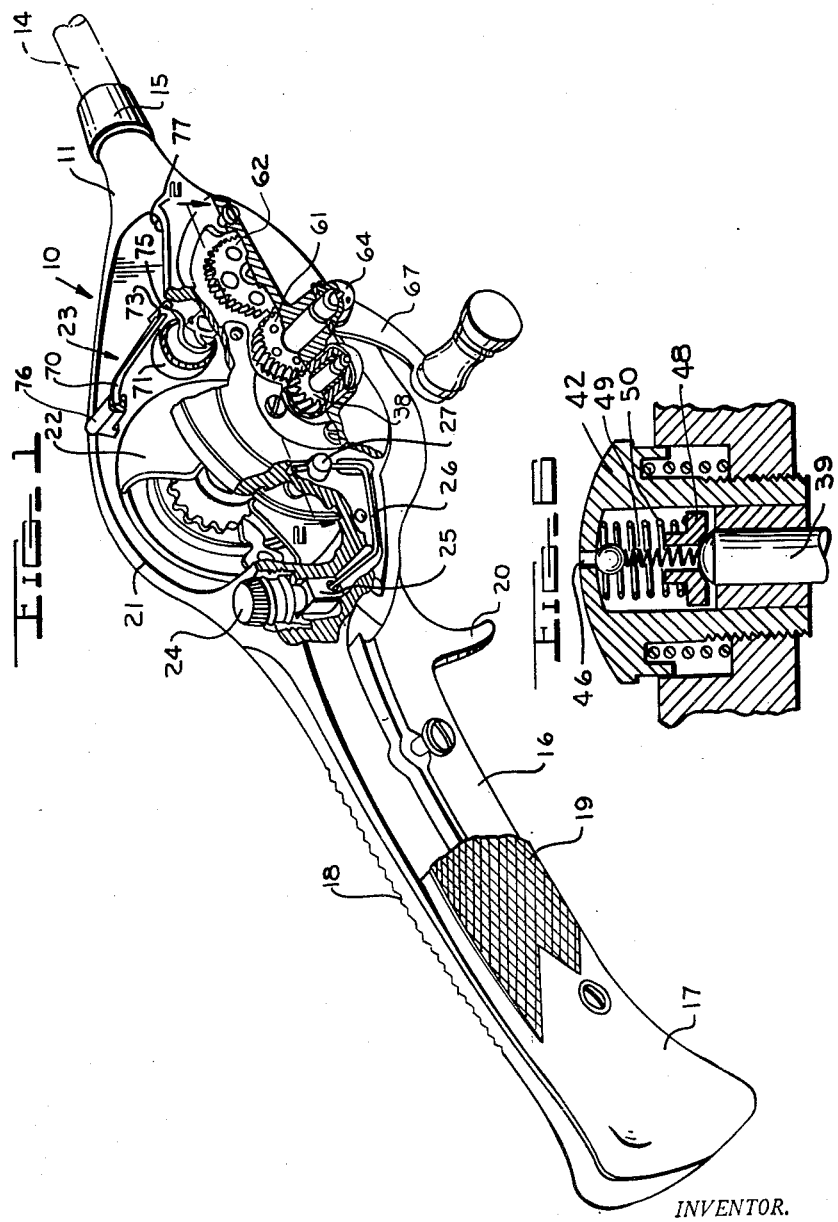
INVENTOR.
EDWIN P. HURD
BY
Arthur M. Smith
ATTORNEY Dec. 11, 1951     E. P. HURD     2,578,477
FISHING REEL
Filed June 8, 1946     2 SHEETS—SHEET 2
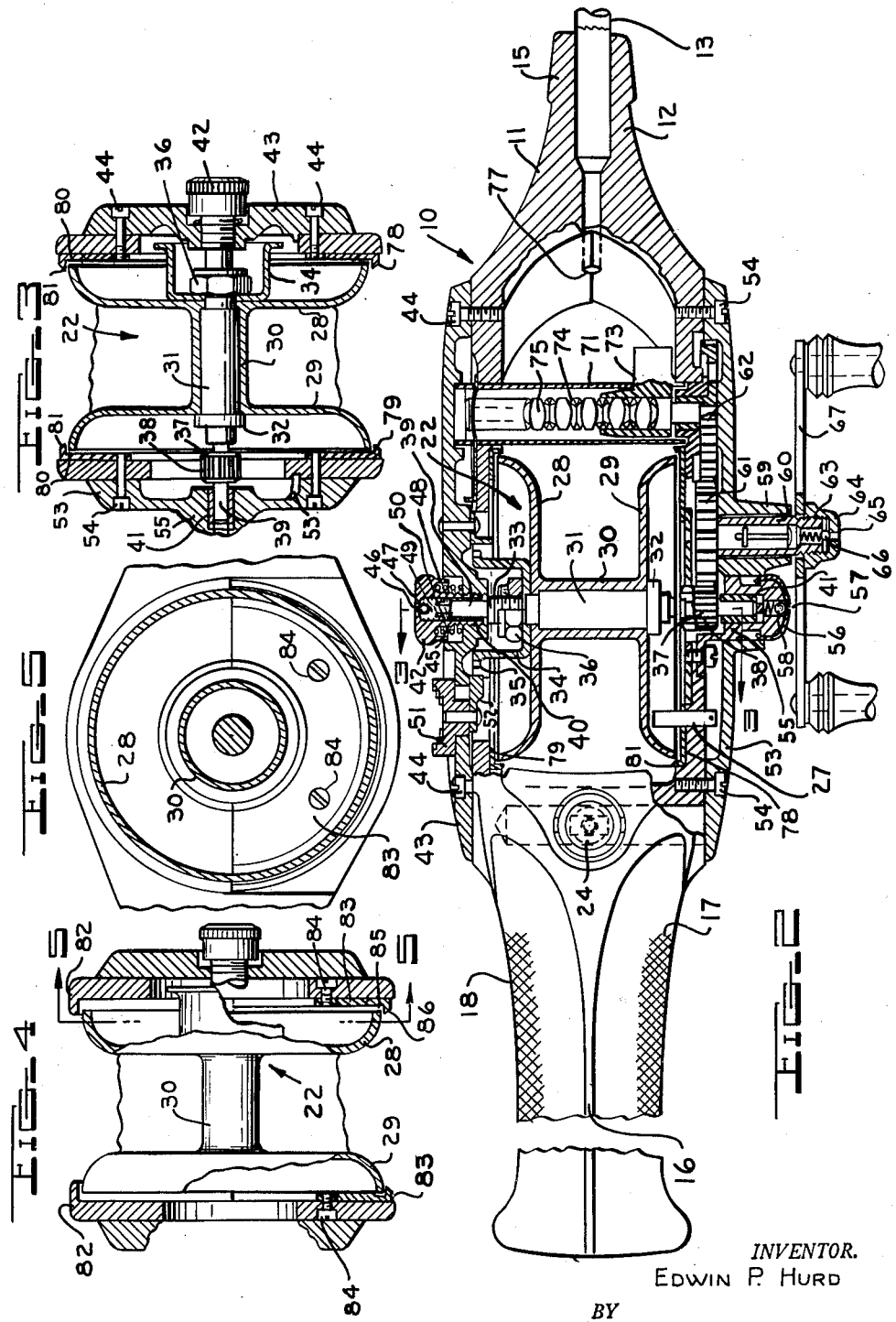
INVENTOR.
EDWIN P. HURD
BY
Arthur M. Smith
ATTORNEY Patented Dec. 11, 1951

2,578,477

UNITED STATES PATENT OFFICE 2,578,477

FISHING REEL

Edwin P. Hurd, Detroit, Mich., assignor to Hurd Lock and Manufacturing Company, Detroit, Mich., a corporation of Michigan Application June 8, 1946, Serial No. 675,388

2 Claims. (Cl. 43—20)

The present invention relates to a fishing reel and more particularly to a fishing reel, combined in a single housing with a rod seat and the skeleton frame member of the handle.

The principal objects of the present invention are:

(1) To provide a combined fishing reel, rod seat and handle in a unitary housing preferably formed of a lightweight metal alloy casting;

(2) To provide a combined fishing reel, rod seat and handle of balanced construction and in which the axis of rotation of the rotating spool lies on a line which passes through the center of gravity of the entire unit;

(3) To provide a combined fishing reel, rod seat and handle in which the fishing reel housing, the rod seat and skeleton frame member of the handle are component parts of a single body member thereby eliminating the separate assembly of the reel to the rod and handle, and eliminating the annoyance and trouble frequently experienced when the reel unintentionally becomes loose on the reel seat or becomes accidentally detached therefrom as may occur in conventional constructions in which the reel is formed as a separate detachable unit which must be separately secured to the reel seat;

(4) To provide a combined fishing reel, rod seat and handle in which a lightweight free-running line spool is provided in a housing which permits the use of a spool having a relatively large diameter to permit a relatively high rate of line movement relative thereto with a relatively slow speed of spool rotation, the lightweight spool and its relatively slow speed acting to reduce the inertia moment of the spool and producing a reel of unusually desirable operating characteristics;

(5) To provide a combined fishing reel, rod seat and handle in which all the operating parts of the reel mechanism are protected against corrosion and excessive wear due to dirt, grit, dust, water and the like;

(6) To provide a combined fishing reel, rod seat and handle of rugged construction and pleasing appearance and which lends itself to volume manufacture by mass production methods.

Other objects of this invention will appear in the following description and appended claims, reference being had to the accompanying drawings forming a part of this specification wherein like reference characters designate corresponding parts in the several views.

In the drawings,

Fig. 1 is a view in perspective with parts broken away and partially in section, showing a fishing reel of the present invention combined with a unitary rod seat and handle.

Fig. 2 is an enlarged fragmentary top plan view partially in section, of the fishing reel shown in Fig. 1, the section being taken substantially on the line 2—2 in the direction of the arrows, Fig. 1.

Fig. 3 is a section taken substantially on the line 3—3 in the direction of the arrows, Fig. 2.

Fig. 4 is an elevation with parts broken away and partially in section, showing a reel spool and a modified type of shroud members attached to portions of the reel housing.

Fig. 5 is a section taken substantially on the line 5—5 in the direction of the arrows, Fig. 4.

Fig. 6 is an enlarged section showing a detail of bearing structure in Fig. 2.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The combined reel, rod seat and handle embodying the present invention comprises a unitary body 10 formed preferably as a single cast unit of a lightweight metallic alloy. Such metals as aluminum, magnesium, or certain of their alloys are particularly desirable materials when suitably treated or protected against corrosion, as for example, by anodizing or similar surface protecting processes which are well known. While a unitary casting is the preferred form of construction employed in the formation of the body portion 10, it is to be understood that the unitary body member may, if desired, be formed by other methods and from other materials.

The body portion 10 is so formed as to provide a nose portion 11 in which is provided a rod ferrule seat 12 in which the rod ferrule 13 of a fishing rod 14 is detachably nested. An enlarged tapered collar 15 is provided to reinforce the circumferential end portion of the nose surrounding the rod ferrule seat 12.

At the opposite end of the body 10, a tail portion 16 is provided which acts as a backbone on which knurled handle grip members 17 and 18 are detachably secured. The knurled handle grip members 17 and 18 are preferably formed of wood, plastic, or similar materials, and may be provided with any desired surface ornamentation to produce serrated surface areas 19 which facilitate the positive gripping of the handle by the user. A depending fixed finger rest trigger 20 is formed as an integral part of the tail portion 16 and is suitably located on the lower edge thereof to permit its ready engagement by the finger of the user. The handle and trigger together provide a pistol type grip which is convenient for the user and provides positive control of the unit during each cast and during the line retrieving operations.

The longitudinal central portion of the body 10, located between the tail portion 16 and the nose portion 11, is formed to provide a chambered reel housing 21 which is open at the top and bottom and in which is mounted a rotatable line spool 22 and a level wind mechanism 23. An adjustable drag and brake operating button 24 is located at the rear of the reel housing 21 at a convenient point to facilitate its ready operation by pressures exerted by the thumb of the user.

The combined adjustable drag and brake mechanism is more particularly disclosed and claimed in my co-pending application Serial No. 673,761, now Patent No. 2,553,414 issued May 15, 1951, and is here shown merely as a preferred form of such mechanism. It is to be understood, however, that other suitable drag and brake mechanisms may be employed, if desired, within the scope of the present invention.

As here shown, the drag and brake mechanism includes an adjustable connector plate 25 adapted to be moved vertically upon rotation of the operating button 24, and also to move vertically with the operating button 24 when the said button is depressed or released. The plate 25 is connected with the brake lever 26 which is journaled in channels provided in the reel housing portion 21 of the body 10. The brake lever 26 is connected with the brake member 27 which is moved relative to the inner face of the end flange of the spool 22, either to apply a drag or braking force thereon, or to release such drag or braking force in response to movement of said operating button 24.

Further details of the construction and operation of such a combined brake and drag mechanism will be found in my said co-pending application to which reference is hereby made.

The rotatable line spool 22 comprises the cupped end flanges 28 and 29 and a transverse core 30. As shown in Figs. 1 to 5 inclusive, the spool 22 is of a one piece construction. The spool 22 as shown in Figs. 1 to 5 inclusive, is mounted on a spool assembly stud 31 having an enlarged head 32 on one end and a screw threaded portion 33 on the opposite end. A cupped member 34 having a toothed peripheral flange 35 extends over the screw threaded end portion 33 and is held in place thereon by the screw threaded nut 36.

The spool assembly stud 31 is provided with a male splined end 37 on which is mounted a female splined spool driving gear 38. The spool assembly stud 31 is mounted on a transverse shaft 39 which extends crosswise of the chamber of the reel housing 21 and has its end suitably journaled in spool shaft bearings 40 and 41.

The bearing 40 is an adjustable end thrust bearing which acts as an anti-backlash drag which is adjustable to compensate for variations in the weight of lure used. The bearing 40 also acts as a journal for the shaft 39. It is carried in the depending end portion of a screw threaded bearing adjusting member 42 which has a screw threaded engagement with a removable side plate 43. The plate 43 is detachably connected with one side of the reel housing 21 by a plurality of machine screws 44. A coil spring 45 seats in a recess provided in the face portion of the side plate 43 and bears on the inside circumferential flange provided in the bearing adjusting member 42. The spring 45 acts to provide a frictional force which holds the bearing adjusting member 42 in the adjusted position. The bearing adjusting member 42 is drilled to provide an oil duct 46 which is normally closed by a spring pressed ball member 47. A frictional member 48 acts as the spring seat for the ball spring 49 and extends over and bears on the end of the shaft 39. A compression spring 50 in the bearing adjusting member 42 engages one face of the washer 48 so that the desired amount of friction to provide the desired drag on the spool and to control end thrust of the shaft 39 may be exerted on the shaft 39 when the bearing adjusting member 42 is suitably adjusted.

A click button 51 is mounted on the removable plate 43 and carries a resilient pawl 52 whose end is moved by sliding movement of the click button 51, into and out of engagement with the toothed peripheral flange 35 of the cupped member 34. When the end of the resilient pawl 52 is moved into engagement with the toothed peripheral flange 35, the frictional engagement will resist yieldably the rotation of the spool 22. The end of the resilient pawl 52 is sufficiently flexible to permit rotation of the toothed peripheral flange of the cupped member 34 relative thereto. This provides a means to hold the reel spool 22 against its free rotation when the reel is not in use.

A removable side plate 53 is detachably connected by a plurality of machine screws 54 with the other side flange of the reel housing 21 and is formed to extend around a bearing bracket 55 which is secured to the adjacent side flange of the reel housing 21. The bearing 41 in which one end of the shaft 39 is journaled, is mounted in the bracket 55. A bearing cover 56 nests in an opening provided in the side plate 53 and is secured over the end of the bracket 55 and bearing 41. The cover 56 is drilled to provide an oil duct 57 which is normally closed by a spring pressed ball closure member 58.

The removable side plate 53 is provided with an extended housing portion 59 in which is journaled a hollow reel drive shaft 60 to which is secured the main drive gear 61 which meshes on one side with the spool drive gear 38 and which meshes on its opposite side with the level wind lead screw drive gear 62. The hollow shaft 60 is provided with a threaded end portion 63 which is engaged by a threaded cap 64 which is drilled to provide an oil duct 65. A spring pressed ball member 66 may be provided to normally close said duct 65.

A double crank operating handle 67 is operatively connected with the threaded end portion 63 of the shaft 60 and is held in place thereon by the cap 64.

The level wind mechanism, as here shown, comprises a travelling line guide 70 in the form of an elongated loop. The guide 70 is mounted adjacent the nose portion 11 of body 10 and is connected with a follower 73 which engages the reverse cut path cams or threads 74 on the rotatable lead screw 75 which is operatively connected with the lead screw drive gear 62 for rotation therewith in response to rotation of the handle 67. The rotation of the lead screw 75 in one direction causes the follower 73 to move in a reciprocating rectilinear path which causes the guide 70 to move transversely of the reel and feed the line back and forth across the line holding width of the line spool 22. A guide 76 extends transversely of the forward end of the reel housing 21 and engages the free end of the line guide 70. A shroud 71 extends around the lead screw 75 and acts as a guard to keep sand and the like from coming in contact with the threads in the lead screw 75.

To assure drainage of the rod ferrule seat 12 and to assist in the ready assembly and disassembly of the rod ferrule 13 and seat 12, a drainage port and air duct 77 is provided and leads from the bottom portion of the seat 12 to the open chamber in which the reel spool is mounted.

Each of the cupped end flanges 28 and 29 of the spool 22 open toward an adjacent side of the reel chamber and so present their smooth rounded surfaces to the line. In order to protect the edges of the flanges 28 and 29 and to reduce the area through which dirt, grit, and the like might enter the operating parts of the reel mechanism, I have provided removable spool shrouds or guards 78 and 79. Each shroud or guard is provided with a circumferential groove 80 terminating in a circumferential lip 81 which overlies the circumferential edge portion of the adjacent end flange of the spool 22.

As shown in Figs. 1, 2 and 3, the shroud or guard 78 and 79 are circular discs which are removably mounted on the sides of the reel housing.

In the modification of the present invention shown in Figs. 4 and 5, the circumferential edge portions of the cupped end flanges 28 and 29 of the spool 22, each extend into a top recess provided by an overlying lip portion 82 formed at the top edges on each side of the reel housing. To permit assembly of the reel spool 22 in the reel housing and to permit its removal therefrom as a single unit, removable half-circular shrouds or guards 83 are removably secured to the opposite sides of the reel housing by a plurality of machine screws 84. Each of the half-circular shrouds or guards 83 is provided with a peripheral half-circular groove 85 and a peripheral half-circular lip 86 which overlies the adjacent portions of the circumferential edge of the end flange of the spool 22.

The spool 22 may be of any desired dimensions or proportions within the limits fixed by the design of the reel housing portion of the body member 10. The spool 22 as here shown has a relatively large diameter in order to permit rapid line retrieving with a relatively slow spool speed. The double crank handle 67 rotates at all times with the spool 22 and thus acts as a flywheel therefor to assure balanced rotation of the spool 22 during the casting operation. The handle 67 drives the spool 22 during the line retrieving operation.

From the foregoing it will be noted that all of the operating parts of the reel mechanism are enclosed in removable guard members so as to provide complete protection therefor, and at the same time the reel is so constructed as to permit ready access to all of its operating parts when required for service or maintenance operations. The gears utilized are preferably meshed to form a gear train driven by the main drive gear 61.

From the foregoing it will be seen that I have provided a combined fishing reel, rod seat, and handle in which a unitary one piece housing is provided in which the separate assembly of the reel to the reel seat, rod and handle is eliminated. The operating parts of the mechanism are protected by suitable enclosures and thus excessive wear due to corrosion, dirt, grit, dust, water and the like is eliminated. The resultant design is pleasing in appearance and the construction is rugged. The entire unit is so designed as to lend itself readily to volume manufacture by mass production methods.

I claim:

1. In a fishing tackle assembly, a one-piece body having an integral rod seat formed at one end thereof, an integral handle skeleton formed at the other end thereof, an integral reel housing located in said body between said rod seat and said handle skeleton, a rotatable reel spool mounted in said housing, drive means mounted on said housing and operatively connected with said spool, said rotatable spool comprising cupped end flanges and a core portion secured together, and means to protect the edge portion of said cupped end flanges comprising an overlying half-circular lip formed on one-half of each side of the said reel housing and a half-circular removable shroud secured to the other half of each side of said reel housing, each of said removable shrouds having a lip overlying the adjacent portion of the circumferential edge of the cupped spool flange.

2. In a fishing tackle assembly, a one-piece body having an integral rod seat formed at one end thereof, an integral tail portion formed at the other end thereof, a reel housing chamber located between said tail portion and said seat portion, hand grip members secured to the opposite sides of said tail portion, a line spool journaled in said reel housing chamber and comprising a core having a cupped end flange on each end thereof, and means to protect the edge portions of said flanges and to guard the line spool and including removable shrouds secured to the sides of said reel housing and having lip portions overlying the adjacent circumferential edge portions of said spool flanges.

EDWIN P. HURD.

REFERENCES CITED

The following references are of record in the file of this patent:

UNITED STATES PATENTS

| Number | Name | Date |
|---|---|---|
| 646,737 | Howe | Apr. 3, 1900 |
| 756,364 | Hermance | Apr. 5, 1904 |
| 1,500,390 | Hussey | July 8, 1924 |
| 1,605,710 | Ford | Nov. 2, 1926 |
| 2,172,389 | Kerr | Sept. 12, 1939 |
| 2,204,125 | Dayton | June 11, 1940 |
| 2,451,862 | Nelson | Oct. 19, 1948 |

FOREIGN PATENTS

| Number | Country | Date |
|---|---|---|
| 882,204 | France | May 21, 1943 |